(12) United States Patent
Kim

(10) Patent No.: US 8,909,146 B2
(45) Date of Patent: Dec. 9, 2014

(54) APPARATUS AND METHOD FOR DATA TRANSMISSION USING BLUETOOTH SIGNAL STRENGTH IN PORTABLE COMMUNICATION SYSTEM

(75) Inventor: Jong-Hwan Kim, Suwon-si (KR)

(73) Assignee: Samsung Electronics Co. Ltd (KR)

( * ) Notice: Subject to any disclaimer, the term of this patent is extended or adjusted under 35 U.S.C. 154(b) by 2135 days.

(21) Appl. No.: 11/860,299

(22) Filed: Sep. 24, 2007

(65) Prior Publication Data

US 2008/0176516 A1 Jul. 24, 2008

(30) Foreign Application Priority Data

Jan. 23, 2007 (KR) .................. 10-2007-0006853

(51) Int. Cl.
| | |
|---|---|
| *H04B 7/00* | (2006.01) |
| *H04M 1/725* | (2006.01) |
| *H04L 29/08* | (2006.01) |
| *H04W 8/00* | (2009.01) |
| *H04W 92/18* | (2009.01) |

(52) U.S. Cl.
CPC ............... *H04L 67/16* (2013.01); *H04W 8/005* (2013.01); *H04W 92/18* (2013.01); *H04M 1/7253* (2013.01); *H04L 67/04* (2013.01)
USPC ...................................................... 455/41.2

(58) Field of Classification Search
CPC ...................................................... H04L 67/04
USPC ...................................................... 455/41.2
See application file for complete search history.

(56) References Cited

U.S. PATENT DOCUMENTS

| | | | |
|---|---|---|---|
| 2002/0132584 A1* | 9/2002 | Izumi ........................... | 455/41 |
| 2003/0220765 A1 | 11/2003 | Overy et al. | |
| 2005/0073522 A1* | 4/2005 | Aholainen et al. ........... | 345/440 |

FOREIGN PATENT DOCUMENTS

| | | |
|---|---|---|
| KR | 1020060107299 | 10/2006 |
| KR | 1020070016622 | 2/2007 |
| WO | WO 03/081373 | 10/2003 |

OTHER PUBLICATIONS

Genco et al.: Bluetooth Base Station Minimal Deployment for High Definition Positioning, The Second Annual International Conference on Mobile and Ubiquitous Systems: Networking and Services, 2005.
Bluetooth Specifications V1.1, Part K.11, Object Push Profile, 2001.

* cited by examiner

*Primary Examiner* — David Bilodeau
(74) *Attorney, Agent, or Firm* — The Farrell Law Firm, P.C.

(57) ABSTRACT

Provided are an apparatus and a method for transmitting data to a plurality of other terminals through an Object Push Profile (OPP) service in a Bluetooth-enabled portable terminal. The method includes displaying a list of transmittable data items and detecting whether one or more data items to be transmitted are selected when a data transmission event is generated, searching neighboring Bluetooth devices and measuring signal strength levels of Bluetooth signal of the searched Bluetooth devices when detecting that one or more of the data items to be transmitted are selected, displaying a list of the searched Bluetooth devices and selecting one or more Bluetooth devices to receive the selected data items and transmitting the selected data items to the selected Bluetooth devices.

18 Claims, 4 Drawing Sheets

APPARATUS AND METHOD FOR DATA TRANSMISSION USING BLUETOOTH SIGNAL STRENGTH IN PORTABLE COMMUNICATION SYSTEM

PRIORITY

This application claims priority under 35 U.S.C. §119(a) to an application filed in the Korean Intellectual Property Office on Jan. 23, 2007 and assigned Serial No. 2007-6853, the contents of which are incorporated herein by reference.

BACKGROUND OF THE INVENTION

1. Field of the Invention

The present invention relates generally to a Bluetooth® (hereinafter, "Bluetooth") device, and in particular, to an apparatus and a method for transmitting data to a plurality of other terminals through an Object Push Profile (OPP) service in a Bluetooth-enabled portable terminal.

2. Description of the Related Art

In recent years, the use of portable terminals has been dramatically increasing due to their portability. As the use of the portable terminals increases, service providers and terminal manufacturers develop more convenient additional functions in order to attract more users.

Bluetooth is one of the additional functions that are being developed. Bluetooth is a short distance wireless communication protocol. Using Bluetooth, the portable terminals provide various functions such as a wireless headset function, a music transfer function, a mobile printing function, and a file transfer function.

Bluetooth is defined by the Bluetooth Special Interest Group (SIG), a nonprofit organization established to provide low-priced short distance wireless connection for data communication and voice communication using 2.4 GHz. Bluetooth is based on the IEEE 802.11 standard. Bluetooth allows an overlapping of multiple independent piconets in the same space, such that Bluetooth can be used even in a space where there are many information processing devices and communication devices. In addition, Bluetooth provides a transmission error correction function, an identification function, an encryption function, and an energy saving function.

FIG. 1 is a diagram illustrating a connection process between a portable terminal with a general Bluetooth module, and neighboring Bluetooth devices.

Referring to FIG. 1, in order to use neighboring Bluetooth devices 122, 124, and 126 corresponding to services provided by a portable terminal 100 with a Bluetooth module, the portable terminal 100 searches for neighboring Bluetooth devices connectable to the portable terminal 100. Thereafter, a list 102 of the searched Bluetooth devices 122, 124 and 126 is generated and one Bluetooth device for connection to the portable terminal 100 is selected from the list 102.

In other words, one Bluetooth device to be used is selected from the list 102, and then a service corresponding to the selected Bluetooth device is performed between the selected Bluetooth device and the portable terminal 100.

The Bluetooth devices support an Object Push Profile (OPP) service, a Serial Port Profile (SPP) service, and a File Transfer Profile (FTP) service.

The OPP service allows a VersitCard (vCard) and a VersitMemo (vMemo) to be exchanged between personal computers and personal digital assistants and mobile communication terminals. The SPP service emulates a serial cable connection. The FTP service allows files to be exchanged.

Within the OPP service, both a server role and a client role are defined. An OPP server and an OPP client may selectively perform a push operation or a pull operation. The operations of the OPP server and the OPP client are performed through a peer-to-peer connection.

In case when data transmission is performed through the OPP service providing the peer-to-peer connection, a Bluetooth device that acts as an OPP server repeats data transmission as many times as the number of other Buletooth devices that request the data transmission.

Therefore, an apparatus and method for multicasting data to a plurality of Bluetooth devices when the portable terminal transmits the data through the OPP service is required.

SUMMARY OF THE INVENTION

An object of the present invention is to substantially solve at least the above problems and/or disadvantages and to provide at least the advantages below. Accordingly, an object of the present invention is to provide an apparatus and method for multicasting data in a portable terminal with a Bluetooth module.

Another object of the present invention is to provide an apparatus and method for improving a data transmission rate in a portable terminal with a Bluetooth module.

Still another object of the present invention is to provide an apparatus and method for measuring signal strength levels of Bluetooth signals of neighboring Bluetooth devices in a portable terminal with a Bluetooth module.

According to one aspect of the present invention, an apparatus for multicasting data when the data is transmitted through an Object Push Profile (OPP) service, includes a Bluetooth module for searching neighboring Bluetooth devices for a data transmission and performing a communicative connection with the searched Bluetooth devices; a signal measurement unit for measuring signal strength levels of Bluetooth signals of the searched Bluetooth devices received through the Bluetooth module and providing the measured Bluetooth signal strength levels to a control unit; and the control unit for controlling the Bluetooth module to search the neighboring Bluetooth devices, controlling the signal measurement unit to measure the signal strength levels of Bluetooth signals of the searched Bluetooth devices, and controlling a list to be displayed when detecting that one or more data items to be transmitted are selected, the list including the searched Bluetooth devices and corresponding Bluetooth signal strength levels.

According to another aspect of the present invention, a method for transmitting data through an OPP service in a portable terminal, includes displaying a list of transmittable data items and detecting whether one or more data items to be transmitted are selected when a data transmission event is generated; searching neighboring Bluetooth devices and measuring signal strength levels of Bluetooth signal of the searched Bluetooth devices when detecting that one or more of the data items to be transmitted are selected; displaying a list of the searched Bluetooth devices and selecting one or more Bluetooth devices to receive the selected data items; and transmitting the selected data items to the selected Bluetooth devices.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. Therefore, the terms used herein must be understood based on the descriptions made herein.

Hereinafter, a description will be given of an apparatus and method for multicasting data when a portable terminal with a Bluetooth module transmits the data through an Object Push Profile (OPP) service. Transmittable data through the OPP service may include at least one of a VersitCard (vCard), a VersitCalendar (vCalendar), and a VersitMemo (vMemo).

In addition, a portable terminal defined in the following description includes Bluetooth-enabled portable devices and mobile communication terminals such as cellular phones, Personal Communication System (PCS) phones, Personal Data Assistants (PDAs), International Mobile Telecommunications-2000 (IMT-2000) terminals, and 4th-generation (4G) broadband system terminals. The following description will be made with reference to the general structure of the above terminals.

Figure 1:
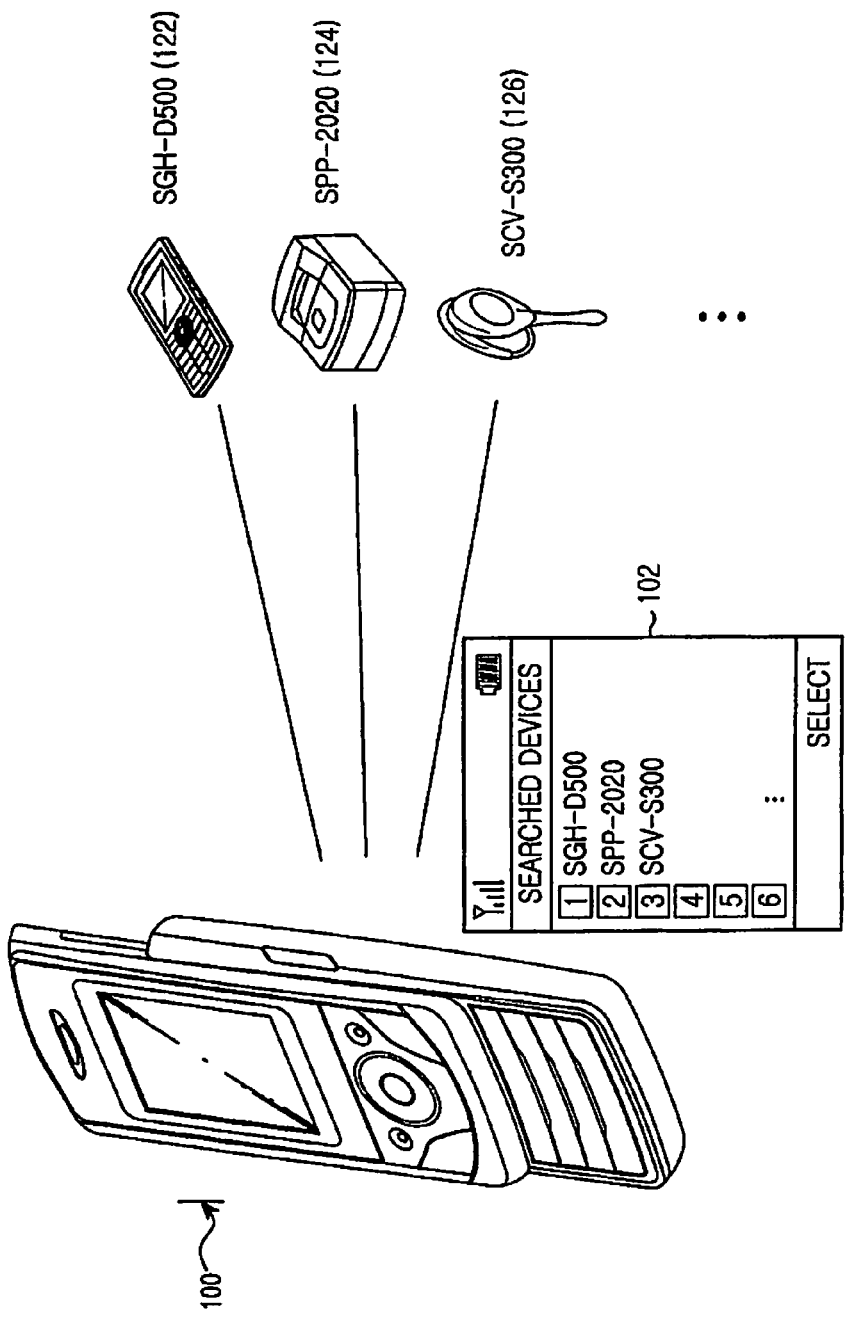
FIG. 1 is a diagram illustrating connection between a portable terminal with a general Bluetooth module and neighboring Bluetooth devices.
Figure 2:
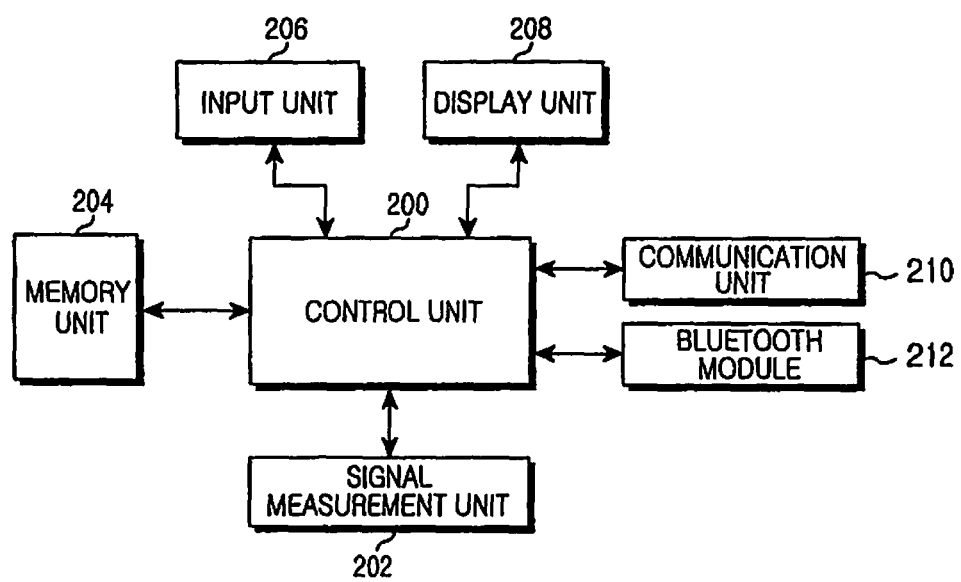
FIG. 2 is a block diagram of a portable terminal for multicasting data when the data is transmitted through the OPP service according to the present invention.

FIG. 2 is a block diagram of a portable terminal for multicasting data when the data is transmitted through the OPP service according to the present invention.

Referring to FIG. 2, a portable terminal 100 includes a control unit 200, a signal measurement unit 202, a memory unit 204, an input unit 206, a display unit 208, a communication unit 210, and a Bluetooth module 212.

The control unit 200 controls an overall operation of the portable terminal 100. For example, the control unit 200 processes and controls voice communication and data communication. In addition to the general functions, when detecting a request for data transmission from a user, the control unit 200 controls a list of transmittable data items to be displayed through the display unit 208.

Thereafter, when detecting that the user selects one or more data items from the list, the control unit 200 controls the Bluetooth module 212 to search neighboring Bluetooth devices 122, 124, and 126 that receive the selected data items, and controls the signal measurement unit 202 to measure Bluetooth signal strength levels of the searched Bluetooth devices.

In addition, the control unit 200 controls a list of the searched Bluetooth devices 122, 124, and 126 to be displayed. The list is made based on the measured Bluetooth signal strength levels provided from the signal measurement unit 202.

Moreover, the control unit 200 controls the selected data items to be transmitted to one or more Bluetooth devices selected by the user from the list of the searched Bluetooth devices.

The signal measurement unit 202, under the control of the control unit 200, receives signals broadcast from the neighboring Bluetooth devices 122, 124, and 126, measures signal strength levels of the signals, i.e., Bluetooth signal strength levels, and provides the measured Bluetooth signal strength levels to the control unit 200.

The signal measurement unit 202 may measure the Bluetooth signal strength levels using Received Signal Strength Indicators (RSSIs) of the signals broadcasted from the neighboring Bluetooth devices, and Link Quality (LQ).

The memory unit 204 includes a Read Only Memory (ROM), a Random Access Memory (RAM), and a flash ROM. The ROM stores micro-codes of a program for processing and controlling operations of the control unit 200 and the signal measurement unit 202 and diverse reference data.

The RAM serves as a working memory of the control unit 200 and stores temporary data generated during execution of programs. The flash ROM stores various reserved data that can be updated, such as a phonebook and outgoing and incoming messages.

The input unit 206 includes numeric keys '0' to '9' and a plurality of function keys, such as a Menu key, a Cancel (Delete) key, an Enter key, a Talk key, an End key, an Internet connection key, Navigation keys (or direction keys), and character input keys. The key input data (for example, a request for data transmission) corresponding to a key pressed by the user is transmitted to the control unit 200.

The display unit 208 displays status information generated during the operation of the portable terminal 100, a restricted number of characters, moving pictures, still pictures, etc. The display unit 208 may be a color Liquid Crystal Display (LCD).

The communication unit 210 transmit/receive (TX/RX)-processes Radio-Frequency (RF) signals transmitted/received through an antenna (not illustrated). For example, in the case of transmission, the communication unit 210 performs channel coding and spreading on TX data and RF-processes the resulting data. In the case of reception, the communication unit 210 converts received RF signals into baseband signals and performs de-spreading and channel decoding on the baseband signals to recover the original data.

The Bluetooth module 212, under the control of the control unit 200, searches for neighboring Bluetooth devices connectable to the portable terminal 100, and performs a pairing process on the searched Bluetooth devices for Bluetooth communication.

The control unit 200 may perform the functions of the signal measurement unit 202. Although separate units are provided for individually describing the functions of the control unit 200, the control unit 200 may be designed to perform all of the functions of the signal measurement unit 202.

The above description is about the apparatus for multicasting data in case when the portable terminal 100 transmits data through the OPP service. From now on, a description will be made about a process for multicasting data using the above apparatus when the OPP service is used according to an embodiment of the present invention.

Figure 3:
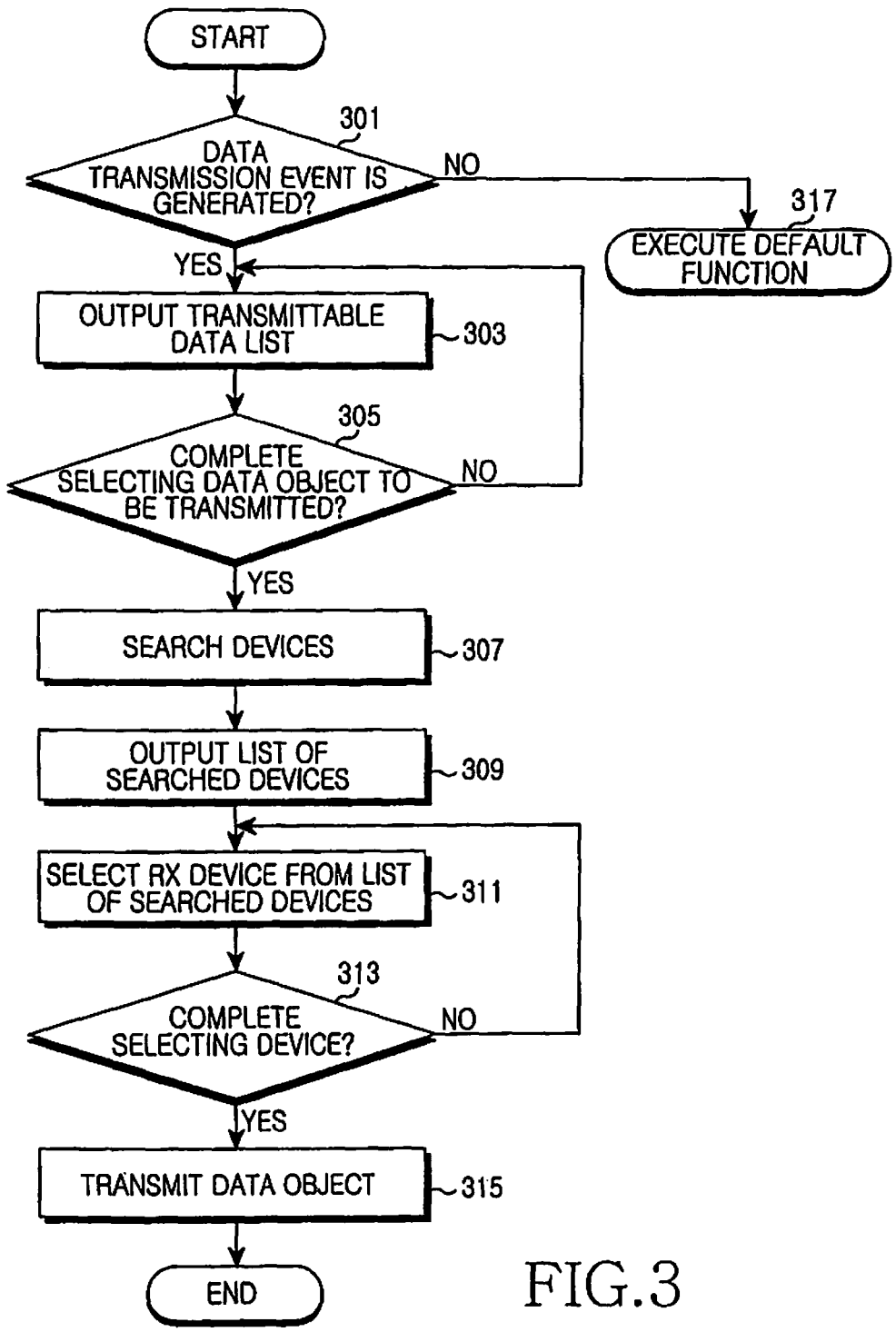
FIG. 3 is a flow diagram illustrating a process for multicasting data in a portable terminal according to the present invention.

FIG. 3 is a flow diagram illustrating a process for multicasting transmittable data in a portable terminal according to the present invention.

Referring to FIG. 3, in step 301, the control unit 200 of the portable terminal 100 detects whether a data transmission event is generated by a user. If a data transmission event is not generated, the control unit 200 performs a default function (e.g., a standby mode operation) in step 317.

If the data transmission event is generated, the control unit 200 controls a list of transmittable data items to be displayed on the display unit 208 in step 303. The data items may include a vCard, a vMemo, and a Calendar transmittable through the OPP service.

In step 305, the control unit 200 detects whether the user selects one or more data items to be transmitted. If the user does not select any data items, the control unit 200 repeats step 303.

On the contrary, if the user selects one or more data items, the control unit 200 controls the signal measurement unit 202 to search the neighboring Bluetooth devices 122, 124, and 126 connectable to the portable terminal 100 in step 307. In addition, the control unit 200 controls a list of the searched Bluetooth devices to be displayed on the display unit 208 in step 309.

Specifically, the signal measurement unit 202 may search the neighboring Bluetooth devices 122, 124, and 126 using signals broadcasted from the neighboring Bluetooth devices 122, 124, and 126. In addition, the signal measurement unit 207 measures Bluetooth signal strength levels of the searched Bluetooth devices and provides the measured Bluetooth signal strength levels to the control unit 200, and then the control unit 200 controls a list to be displayed. The list includes the searched Bluetooth devices 122, 124, and 126 and the corresponding Bluetooth signal strength levels.

The Bluetooth signal strength levels may be measured by using RSSIs of the signals broadcast from the searched Bluetooth devices 122, 124, and 126 and LQ.

In step 311, the user selects one or more Bluetooth devices to receive the selected data items. Step 311 indicates a process wherein the user selects one or more Bluetooth devices, which receive the selected data items, from the list of the searched Bluetooth devices.

In step 313, the control unit 200 determines whether the user has completed the process of selecting Bluetooth devices that receive the selected data items. If the user has not completed the selection process, the control unit 200 repeats step 311.

On the contrary, in step 315, if the user has completed the selection process, the control unit 200 transmits the selected data items to Bluetooth devices selected in step 311.

Specifically, the control unit 200 may control the selected data items to be sequentially transmitted to the selected Bluetooth devices in the order of the Bluetooth signal strength levels, for example. The selected data items may be transmitted to each of the selected Bluetooth devices.

FIGS. 4A to 4D illustrate displayed screens of a portable terminal multicasting a data item to be transmitted according to the present invention.

Figure 4D:
FIGS. 4A to 4D illustrate displayed screens of a portable terminal multicasting data according to the present invention.
Figure 4C:
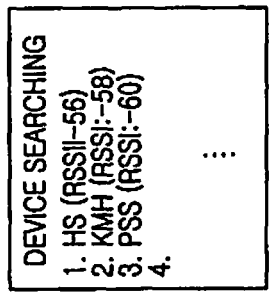
Figure 4B:
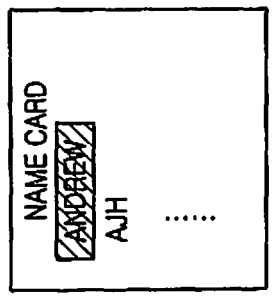
Figure 4A:
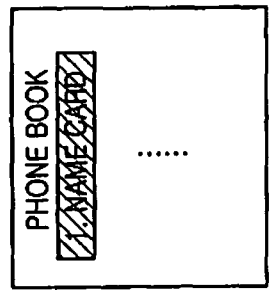

FIG. 4A illustrates a displayed screen displaying a list of data items transmittable through the OPP service. In the displayed screen, a vCard item is selected from the list.

FIG. 4B illustrates a displayed screen displaying a vCard selected from among vCards prestored in the portable terminal. The selected vcard is to be transmitted to RX portable terminals serving as neighboring Bluetooth devices.

As illustrated in FIG. 4B, when the vCard of "Andrew" is selected as a vcard that is to be transmitted to the RX portable terminals. The portable terminal searches the RX portable terminals that exist in the peripheral area of the portable terminal.

After the portable terminal has searched all of the RX portable terminals that exist in the peripheral area of the portable terminal, the portable terminal generates a list of the searched RX portable terminals and provides the list to a user.

As illustrated in FIG. 4C, a list includes the searched RX portable terminals and corresponding Bluetooth signal strength levels. The list may show the searched RX portable terminals in the descending order of their Bluetooth signal strength levels.

FIG. 4D illustrates a displayed screen displaying RX portable terminals. The RX portable terminals are selected so as to receive the vCard of "Andrew" selected in FIG. 4B. As illustrated in FIG. 4D, the user may select a plurality of RX portable terminals.

Thereafter, the portable terminal transmits the vCard of "Andrew" to the RX portable terminals selected in FIG. 4D.

That is, the portable terminal may sequentially transmit the vCard of "Andrew" to the RX portable terminal of "HS", the RX portable terminal of "KMH", and the RX portable terminal of "PSS" selected in FIG. 4D.

Thus, a peer-to-peer connection problem in conventional data transmission methods can be overcome by using the above-described method.

As described above, prestroed data are transmitted to a plurality of Bluetooth devices by using the portable terminal with the Bluetooth module according to the present invention, such that there is no need to perform a peer-to-peer communication.

In addition, the portable terminal can select a Bluetooth device having a strong Bluetooth signal strength level when data is transmitted, such that data transmission rate can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for transmitting data when the data is transmitted through an Object Push Profile (OPP) service, the apparatus comprising:

a Bluetooth module for searching neighboring Bluetooth devices for a data transmission and performing a communicative connection with the searched Bluetooth devices;

a signal measurement unit for measuring signal strength levels of Bluetooth signals of the searched Bluetooth devices received through the Bluetooth module and providing the measured Bluetooth signal strength levels to a control unit; and the control unit for controlling the Bluetooth module to search the neighboring Bluetooth devices, controlling the signal measurement unit to measure the signal strength levels of Bluetooth signals of the searched Bluetooth devices, and controlling a list to be displayed when detecting that one or more pre-stored data items to be transmitted are selected, the list including the searched Bluetooth devices and corresponding Bluetooth signal strength levels, wherein the one or more pre-stored data items are sequentially transmitted based on the measured signal strength levels of the Bluetooth signals to a plurality of Bluetooth devices via the Bluetooth module, and wherein the one or more selected data items include at least one of a VersitCard (vCard), a VersitCalendav (vCalendar), and a VerstiMemo (vMemo) that are transmitted through the OPP service.

2. The apparatus of claim 1, wherein the signal measurement unit measures the Bluetooth signal strength levels by using Received Signal Strength Indicators (RSSIs) of signals broadcast from the neighboring Bluetooth devices, and Link Quality (LQ).

3. The apparatus of claim 1, wherein the control unit, after displaying the list and when detecting that the Bluetooth devices are selected from the list, selects one or more Bluetooth devices to transmit the one or more selected data items and controls transmission of the one or more selected pre-stored data items.

4. The apparatus of claim 3, wherein the list of the searched Bluetooth devices is displayed in a descending order of Bluetooth signal strength level.

5. The apparatus of claim 1, wherein the control unit controls the one or more selected data items to be transmitted to the selected Bluetooth devices in a descending order of the measured measure signal strength levels of the Bluetooth signals.

6. The apparatus of claim 1, wherein the control unit controls the one or more selected data items to be transmitted to the selected Bluetooth devices in an ascending order of the measured signal strength levels of the Bluetooth signals.

7. A method for transmitting data through an Object Push Profile (OPP) service in a portable terminal, the method comprising the steps of:
displaying a list of transmittable data items and detecting whether one or more pre-stored data items to be transmitted are selected when a data transmission event is generated;
searching neighboring Bluetooth devices and measuring signal strength levels of Bluetooth signals of the searched Bluetooth devices when detecting that one or more of the data items to be transmitted are selected;
displaying a list of the searched Bluetooth devices and selecting one or more Bluetooth devices to receive the selected data items; and
transmitting the selected data items to the selected Bluetooth devices,
wherein the one or more pre-stored data items are sequentially transmitted based on the measured signal strength levels of the Bluetooth signals to a plurality of Bluetooth devices via a Bluetooth module of the portable terminal, and
wherein the one or more selected data items include at least one of a VersitCard (vCard), a VersitCalendav (vCalendar), and a VerstiMemo (vMemo) that are transmitted through the OPP service.

8. The method of claim 7, wherein the signal strength levels of the Bluetooth signals of the searched Bluetooth devices are measured by using Received Signal Strength Indicators (RSSIs) of signals broadcasted from the neighboring Bluetooth devices, and Link Quality (LQ).

9. The method of claim 7, wherein the list of the searched Bluetooth devices is displayed in descending order of Bluetooth signal strength level.

10. The method of claim 7, wherein the one or more selected data items are transmitted to the selected Bluetooth devices in a descending order of the measured signal strength levels of the Bluetooth signals.

11. The method of claim 10, wherein the one or more selected data items are transmitted to the selected Bluetooth devices in an ascending order of the measured signal strength levels of the Bluetooth signals.

12. A method for transmitting data in a portable terminal, the method comprising the steps of:
searching neighboring Bluetooth devices and measuring signal strength levels of Bluetooth signals of the searched Bluetooth devices;
displaying a list of the searched Bluetooth devices and selecting one or more Bluetooth devices; and
transmitting data to the selected Bluetooth devices,
wherein the data is sequentially transmitted based on the measured signal strength levels of the Bluetooth signals to a plurality of Bluetooth devices via a Bluetooth module of the portable terminal, and
wherein the sequentially transmitted data includes one or more data items that include at least one of a VersitCard (vCard), a VersitCalendav (vCalendar), and a VerstiMemo (vMemo) transmitted through an Object Push Profile (OPP) service.

13. The method of claim 12, wherein the signal strength levels of the Bluetooth signals of the searched Bluetooth devices are measured by using Received Signal Strength Indicators (RSSIs) of signals broadcasted from the neighboring Bluetooth devices, and Link Quality (LQ).

14. The method of claim 12, wherein the list of the searched Bluetooth devices is displayed in a descending order of Bluetooth signal strength level.

15. The method of claim 12, wherein the one or more data items are transmitted to the selected Bluetooth devices in a descending order of the measured signal strength levels of the Bluetooth signals.

16. The method of claim 12, wherein the one or more data items are transmitted to the selected Bluetooth devices in an ascending order of the measured signal strength levels of the Bluetooth signals.

17. A portable terminal comprising:
means for searching neighboring Bluetooth devices and measuring signal strength levels of Bluetooth signals of the searched Bluetooth devices;
means for displaying a list of the searched Bluetooth devices and selecting one or more Bluetooth devices; and
means for transmitting data to the selected Bluetooth devices,
wherein the data is sequentially transmitted based on the measured signal strength levels of the Bluetooth signals to a plurality of Bluetooth devices via a Bluetooth module of the portable terminal, and
wherein the sequentially transmitted data includes one or more data items that include at least one of a VersitCard (vCard), a VersitCalendav (vCalendar), and a 'VerstiMemo (vMemo) transmitted through an Object Push Profile (OPP) service.

18. The portable terminal of claim 17, wherein the signal strength levels of the Bluetooth signals of the searched Bluetooth devices are measured by using Received Signal Strength Indicators (RSSIs) of signals broadcasted from the neighboring Bluetooth devices, and Link Quality (LQ).

* * * * *